Patented Aug. 9, 1949

2,478,820

UNITED STATES PATENT OFFICE 2,478,820

LANOLIN PRODUCT

William C. Griffin, Newport, Del., assignor to Atlas Powder Company, Wilmington, Del., a corporation of Delaware No Drawing. Application May 26, 1947, Serial No. 750,649

4 Claims. (Cl. 260—410.6)

The present application relates to alcoholysis products of lanolin and polyoxyethylene ethers of polyhydric alcohols.

An object of the invention is the provision of lanolin alcoholysis products of superior hydrophilic properties.

Another object of the invention is the provision of lanolin alcoholysis products which emulsify to form oil-in-water emulsions.

Still another object of the invention is the provision of lanolin alcoholysis products which form clear dispersions in water.

A further object of the invention is the provision of lanolin alcoholysis products which may be readily included in oil-in-water emulsions.

A still further object of the invention is the provision of lanolin alcoholysis products which may be readily employed in conjunction with other emulsifiers.

Another object of the invention is the provision of lanolin alcoholysis products which may be employed as oil-in-water emulsifiers.

Other objects of the invention will be apparent from the following description.

Lanolin, because of its emollient properties, finds extensive use in cosmetic formulations, as, for example, creams and shampoos. Lanolin also has an emulsifying action which is very useful in such preparations.

According to the present invention hydrophilic lanolin preparations are provided in which the emollient properties of lanolin are retained.

The emulsions normally produced by lanolin are of the water-in-oil type, whereas it is preferred that many cosmetic emulsions be of the oil-in-water type. Hence, when ordinary lanolin is to be used in an oil-in-water type emulsion, it is necessary to balance carefully the lanolin with other emulsifiers so as to obtain the desired phase system.

According to the present invention lanolin preparations may be provided in which the emulsifying action is such as to produce oil-in-water emulsions.

Also it is desirable that many cosmetic preparations be clear and transparent products. Ordinarily, heretofore, lanolin dispersions in water have not been of this character. The lanolin preparations of the present invention, however, can be produced in the so called "water soluble" state, that is so as to form clear and transparent dispersions in water.

The products of the present invention are alcoholysis products of lanolin and polyoxyethylene ethers of polyhydric alcohols. They may be prepared by heating together lanolin and polyoxyethylene ethers of polyhydric alcohols.

As examples of the polyhydric alcohols, polyoxyethylene ethers of which may be employed in the alcoholysis, may be mentioned ethylene glycol, propylene glycol, glycerol, sorbitol, sorbitan, mannitol, and mannitan. In general polyhydric alcohols, which contain as high as 6 carbon atoms per molecule and at least 2/3 as many hydroxyl radicals as carbon atoms, may be used.

Variation in the emulsifying properties of the lanoline alcoholysis products of the invention may be obtained by variation of the relative proportions of lanolin, polyoxyethylene radical, and polyhydric alcohol and of the kind of polyhydric alcohol.

Water dispersible products may generally be obtained when the product contains oxyethylene radical, polyhydric alcohol, oxyethylene ether, and lanolin in proportions as low a 0.5 parts by weight of oxyethylene ether and as high as about 6 parts by weight of oxyethylene ether per part by weight of lanolin, but not more than about 2.5 mols of oxyethylene ether of polyhydric alcohol per mol of lanolin, and as low as about 0.5 mol of oxyethylene radical and as high as about 20 mols of oxyethylene radical per equivalent weight of hydroxyl radical in the polyhydric alcohol.

Some of these water dispersible products will also be found to be "water soluble," that is to say they form clear and transparent dispersions in water.

Lanolin, being a complex natural material, has no true molecular weight. However, for purposes of this specification, lanolin is taken to have a molecular weight equal to its combining weight as determined by its saponification number $$\left(\frac{56.1}{\text{saponification number}} \times 1{,}000 = \text{molecular weight}\right)$$

It is not necessary to use a polyoxyethylene ether of a single polyhydric alcohol for the alcoholysis. For example, a mixed polyoxyethylene ether of two or more polyhydric alcohols may be employed. Usually the polyoxyethylene ethers of polyhydric alcohols which are employed in the present reaction are best prepared by reacting polyhydric alcohols with ethylene oxide, and products produced by reacting a mixture of polyhydric alcohols and ethylene oxide are quite suitable for use to produce the present product. In fact, products produced by reacting ethylene oxide with polyhydric alcohols mixed with water are quite useful in the present invention, for any water present reacts with eythlene oxide to produce ethylene glycol. An oxyethylene ether prepared by reacting a mixture of polyhydric alcohol and water should be considered as containing ether of ethylene glycol in stoichiometric amount equivalent to the amount of water reacted. For the purposes of this specification ethylene glycol is not to be considered an oxyethylene radical.

The alcoholysis reaction is generally most easily conducted by heating lanolin and polyoxyethylene ether of a polyhydric alcohol together, usually with the addition of a small proportion of an alcoholysis catalyst. Such catalysts are well known and, as examples, may be mentioned the alkoxides, oxides, and hydroxides of metals such as, lithium, potassium, sodium, calcium, zinc, and lead. Lead compounds, of course, should not be employed where the product is intended for cosmetic use. 0.1% of sodium hydroxide is generally satisfactory for the alcoholysis. Reaction temperatures of from about 240° C. to about 310° C. are usually adequate to permit the reaction to proceed. The reaction is continued until the desired emulsifying properties in the product are obtained. Usually reaction times of from about 2 to 8 hours will suffice for this purpose.

The invention will be further described by means of the following examples which illustrate specific embodiments.

Example 1

1190 grams of lanolin and 310 grams of the mixed oxyethylene ether prepared by reacting 182 parts by weight of an aqueous solution of sorbitol containing 15% water with 264 parts by weight of ethylene oxide, were charged into an agitated reaction vessel, together with 3 cc. of 500 gram per liter sodium hydroxide. The lanolin had a saponification number of 81 and a combining weight of $$\left(\frac{56.1}{81} \times 1{,}000\right) \text{ or } 694$$

The charge was heated in an atmosphere of carbon dioxide to 250° C., which heating took 110 minutes. The temperature was then maintained for 150 minutes, after which 30 grams of activated carbon were added. Heating was discontinued and agitation continued until the temperature dropped to 180° C. when the charge was filtered. The product resembled lanolin in physical characteristics but differed in that it was readily water dispersible to yield a stable oil-in-water emulsion.

Example 2

850 grams of lanolin of combining weight 694 and 650 grams of the mixed oxyethylene ether obtained by reacting 880 parts by weight of ethylene oxide with 182 parts by weight of 85% aqueous sorbitol solution were charged into an agitated reaction flask together with 3 cc. of 500 gram per liter sodium hydroxide. The charge was heated in an atmosphere of carbon dioxide to a temperature of 275° C. in 75 minutes and held at that temperature for 210 minutes, at which point the reaction mixture was clear. 30 grams of activated carbon were then added, and the mixture was allowed to cool under agitation to 175° C. after which it was filtered The resulting product was quite similar to lanolin in its physical character but differed therefrom in that it formed a stable dispersion in water.

Example 3

500 grams of lanolin having a combining weight of 694 and 1,000 grams of the mixed oxyethylene ether obtained by reacting 182 parts by weight of 85% aqueous solution of sorbitol and 1320 parts by weight of ethylene oxide were charged into an agitated reaction flask together with 3 cc. or 500 gram per liter sodium hydroxide. The charge was heated in an atmosphere of carbon dioxide to a temperature of 270° C. in the course of 75 minutes and held at that temperature for 255 minutes. 30 grams of activated carbon were then added, and the mixture was allowed to cool under agitation to 180° C. and filtered. The resulting product formed a clear transparent dispersion in water at 10% concentration and a slightly hazy dispersion at 50%.

Example 4

414 grams of lanolin of combining weight 630, and 986 grams of the oxyethylene ether of sorbitol obtained by reacting 30 mols of ethylene oxide with 1 mol of sorbitol were charged into an agitated reaction flask together with 2.8 cc. of 500 gram per liter sodium hydroxide. The charge was heated in an atmosphere of carbon dioxide to a temperature of 280° C. for 80 minutes and held at that temperature for 250 minutes. 28 grams of activated carbon were then added, and the mixture was allowed to cool under agitation to 200° C., after which it was filtered The resulting product was quite similar to lanolin in its physical characteristics but differed therefrom in that it formed a transparent dispersion in water.

Example 5

203 lbs. of lanolin having a combining weight of 790, and 497 lbs. of the mixed oxyethylene ether prepared by reacting 182 parts by weight of an 85% aqueous solution of sorbitol with 1760 parts by weight of ethylene oxide, were charged into an agitated, electrically heated reaction kettle, together with 320 grams of sodium hydroxide added in the form of approximately 40% aqueous solution. The charge was brought to a temperature of 275° C. in 4 hours and held at that temperature for a total of 4.25 hours. Test samples were withdrawn at intervals, and it was noted that after 2.25 hours at temperature the reaction mixture was clear but only partially miscible with water. After 3.5 hours at reaction temperature, the product formed an opalescent dispersion in water, and then 14 lbs. activated carbon were added. A filtered sample, after an additional half hour at temperature, formed a clear solution in water, and the charge was cooled to 100° C. and filtered. The resulting product was somewhat darker than lanolin. It was then bleached by heating with sodium chlorite to yield a product lighter in color than the original lanolin, and having very similar physical properties thereto but differing therefrom in that it could be dispersed in water to form a clear transparent "solution."

Example 6

310 grams of lanolin having a combining weight of 630, and 1190 grams of the mixed oxyethylene ether prepared by reacting 182 parts by weight of an aqueous solution of sorbitol containing 15% of water, with 2200 parts by weight of ethylene oxide, were charged into an agitated reaction vessel together with 3 cc. of 500 gram per liter sodium hydroxide. The charge was heated in an atmosphere of carbon dioxide to 295° C. in 95 minutes. The reaction was continued at this temperature for 205 minutes, after which 30 grams of activated carbon were added. The charge was allowed to cool to 185° C. under agitation and was then filtered. The product was somewhat darker than untreated lanolin but was very similar in texture and other physical characteristics to lanolin. Unlike lanolin it formed a clear transparent dispersion in water.

Example 7

551 grams of lanolin having a combining weight of 630, and 949 grams of the oxyethylene ether of glycerol prepared by reacting one molecular proportion of glycerol with 20 molecular proportions of ethylene oxide, were charged into an agitated reaction flask together with 3 cc. of 500 gram per liter sodium hydroxide. The charge was heated in an atmosphere of carbon dioxide to a temperature of 280° C. in 3 hours and held at that temperature for 3.5 hours. 28 grams of activated carbon were added and the heating was continued for an additional half hour after which the charge was cooled to 200° C. and filtered. The product formed a clear transparent dispersion in water.

Example 8

556 grams of lanolin having a combining weight of 630, and 844 grams of the polyoxyethylene ether of propylene glycol, prepared by reacting 20 molecular proportions of ethylene oxide with 1 molecular proportion of propylene glycol, were charged into an agitated reaction flask together with 2.8 cc. of 500 gram per liter sodium hydroxide. The charge was heated in an atmosphere of carbon dioxide to a temperature of 280° C. over a period of 115 minutes and held at that temperature until the reaction mixture cleared. This required 140 minutes. 28 grams of activated carbon were added, and the reaction was permitted to continue for another hour at 280° C. after which the charge was allowed to cool to 135° C. and filtered. The reaction product formed a clear transparent dispersion in water.

Example 9

780 grams of lanolin of combining weight 630, and 620 grams of polyethylene glycol of molecular weight approximately 1,000 were charged into an agitated reaction flask together with 2.8 cc. of 500 gram per liter sodium hydroxide. The charge was heated in an atmosphere of carbon dioxide to a temperature of 280° C. in 250 minutes and held at that temperature for 190 minutes. 28 grams of activated carbon were then added, and the mixture was allowed to cool under agitation to 200° C., after which it was filtered. The resulting product formed a transparent dispersion in water.

Example 10

An all purpose oil-in-water cosmetic cream was prepared in the following manner:
First the following ingredients were mixed together and heated to 70° C.:

| | Parts |
|---|---|
| Stearic acid | 15 |
| Beeswax | 2 |
| Lanolin | 1 |
| Mineral oil | 23 |
| Product of Example 2 | 5 |
| Product of Example 5 | 1 |

Next the following ingredients were mixed together and heated to 72° C.:

| | Parts |
|---|---|
| 85% aqueous solution of commercial sorbitol | 43 |
| Butyl para hydroxy benzoate (preservative) | 0.1 |

The second mixture was slowly added to the first under agitation. The combined mixture was allowed to cool under continued agitation. After the mixture had cooled to 45° C., perfume was added, and after the mixture had cooled to 35° C. it was packed.

Example 11

A clear transparent shampoo was prepared by adding 1 part of the product of Example 6 to 99 parts of soap solution.

In addition to being clear and transparent, this shampoo distinguished over a similar shampoo, in which ordinary lanolin was employed, by its excellent sudsing properties.

Example 12

An oil-in-water face cream was prepared as follows:
A first mixture was made of the following ingredients and was heated to 90° C.:

| | Parts |
|---|---|
| Stearic acid | 15 |
| Mineral oil | 1 |
| Sorbitan monostearate | 2 |
| Product of Example 2 | 1.5 |

A second mixture was made of the following ingredients and heated to 95° C.:

| | Parts |
|---|---|
| 85% aqueous solution of commercial sorbitol | 2.5 |
| Water | 78 |
| Butyl para hydroxy benzoate (preservative) | 0.5 |

The second mixture was added to the first under agitation, and while agitation was continued, the combined mixture was cooled to 50° C. at which time perfume was added. The cream was then permitted to cool to room temperature while being agitated occasionally. It was then allowed to stand overnight, reworked, and packed.

What is claimed is:
1. A lanolin product which emulsifies in water to form an oil-in-water emulsion, which comprises an alcoholysis product of lanolin and polyhydric alcohol oxyethylene ether, each base polyhydric alcohol in said ether containing no more than 6 carbon atoms per molecule, and at least 2/3 as many hydroxyl groups per molecule as carbon atoms, the mol proportion of ethylene oxide radical to hydroxyl radical in said polyhydric alcohol being between about 0.5 and about 20, and the weight of oxyethylene ether being between about 0.5 and about 6 times the weight of lanolin, but the mol proportion of oxyethylene ether per mol of lanolin being not more than about 2.5.

2. A product according to claim 1 in which said polyhydric alcohol oxyethylene ether is selected from the group consisting of oxyethylene ethers of ethylene glycol, propylene glycol, glycerol and sorbitol.

3. A process for preparing a lanolin alcoholysis product which emulsifies in water to form oil-in-water emulsions which comprises heating together 1 mol proportion of lanolin, and from about 0.5 to about 6 times its weight, but not more than about 2.5 molecular proportions of polyhydric alcohol oxyethylene ether, each base polyhydric alcohol in said ether containing not more than 6 carbon atoms per molecule and at least ⅔ as many hydroxyl groups per molecule as carbon atoms, and the mol proportion of ethylene oxide radical to hydroxyl radical in said polyhydric alcohol oxyethylene ether being between about 0.5 and about 20.

4. A process according to claim 3 in which said polyhydric alcohol oxyethylene ether is selected from the group consisting of oxyethylene ethers of ethylene glycol, propylene glycol, glycerol and sorbitol.

WILLIAM C. GRIFFIN.

REFERENCES CITED

The following references are of record in the file of this patent:

UNITED STATES PATENTS

| Number | Name | Date |
|---|---|---|
| 2,137,667 | Eipper | Nov. 27, 1938 |
| 2,365,915 | Taylor | Dec. 26, 1944 |
| 2,383,581 | Arrowsmith | Aug. 28, 1945 |

FOREIGN PATENTS

| Number | Country | Date |
|---|---|---|
| 380,431 | Great Britain | 1932 |